Nov. 23, 1937.   P. E. MERCIER   2,099,819
VEHICLE SUSPENSION
Filed March 9, 1935   3 Sheets-Sheet 1
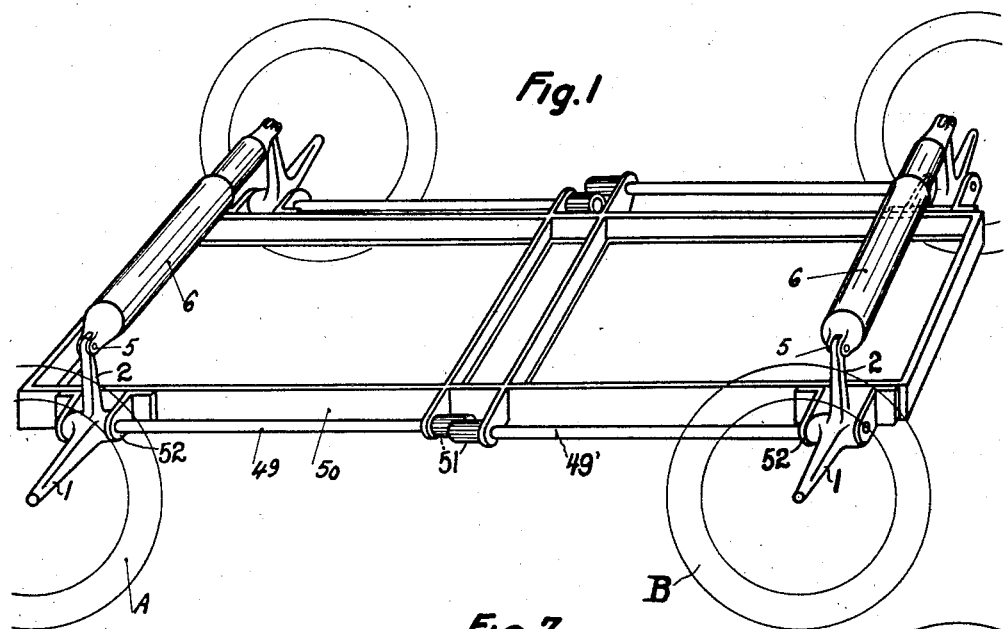
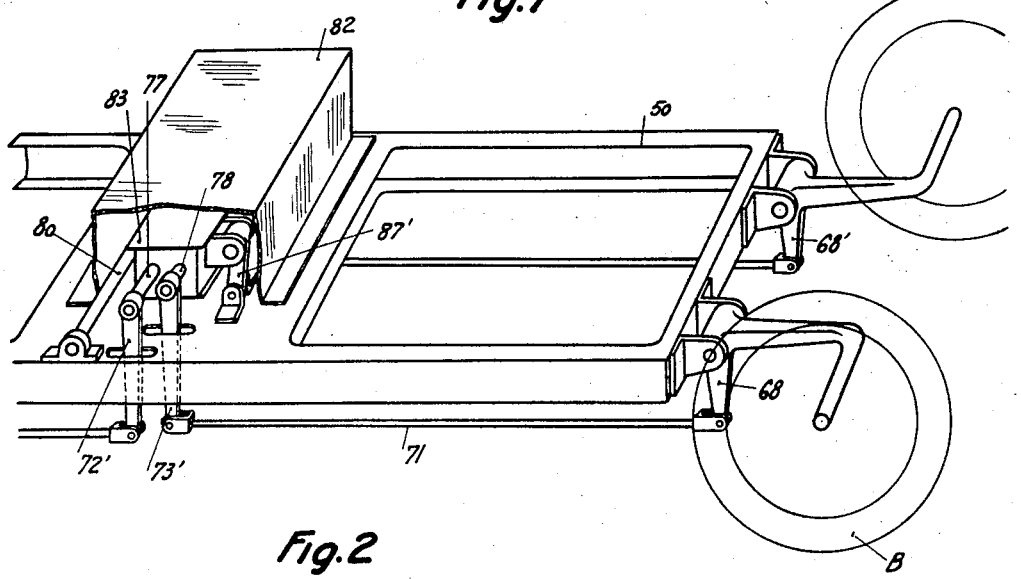
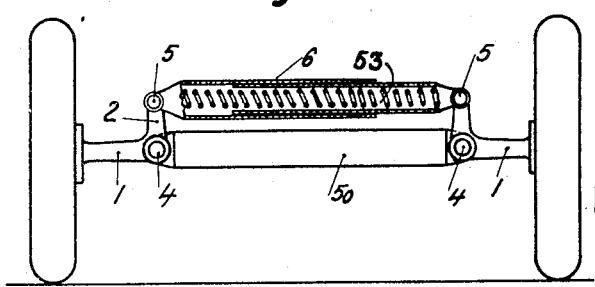
INVENTOR:
PIERRE ERNEST MERCIER
BY Haseltine, Lake & Co
ATTORNEYS Nov. 23, 1937.  P. E. MERCIER  2,099,819
VEHICLE SUSPENSION
Filed March 9, 1935   3 Sheets—Sheet 2
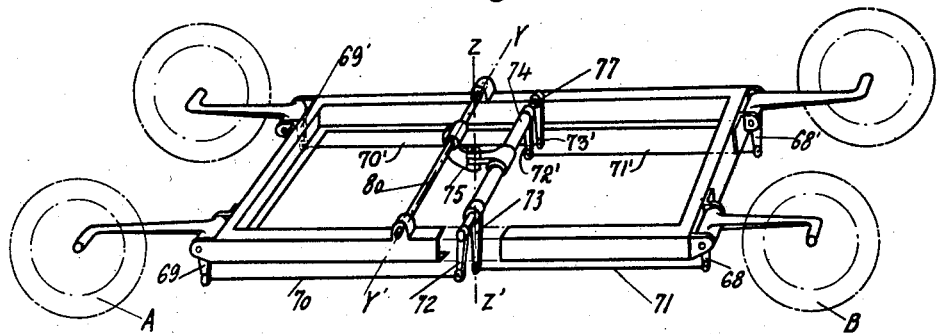
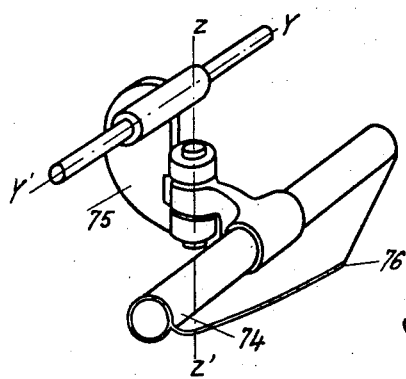
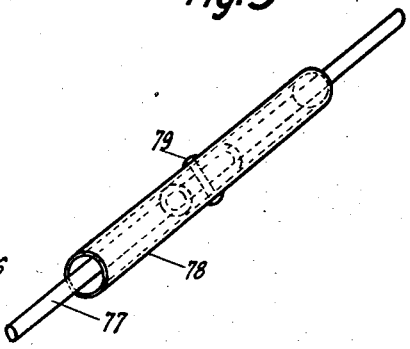
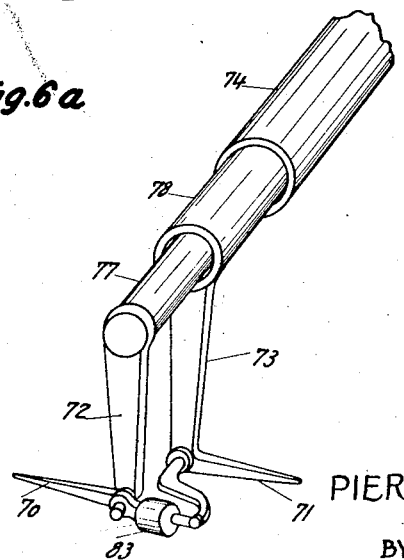
INVENTOR:
PIERRE ERNEST MERCIER
BY Haseltine, Lake & Co.
ATTORNEYS

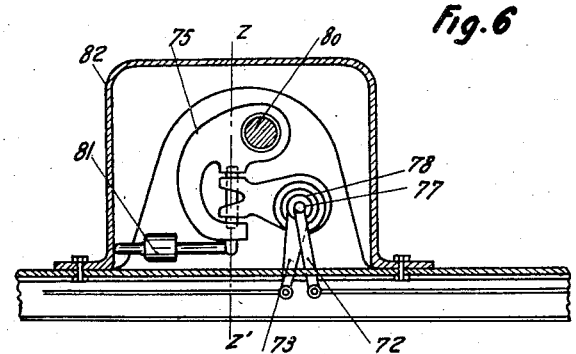
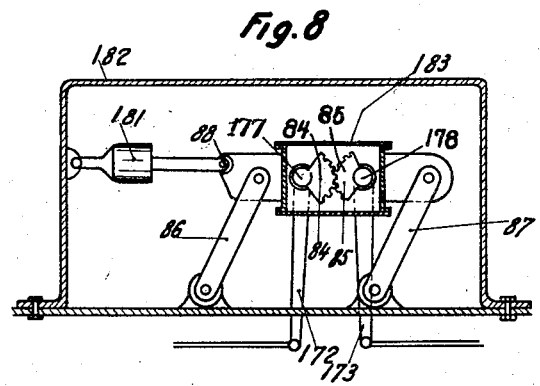
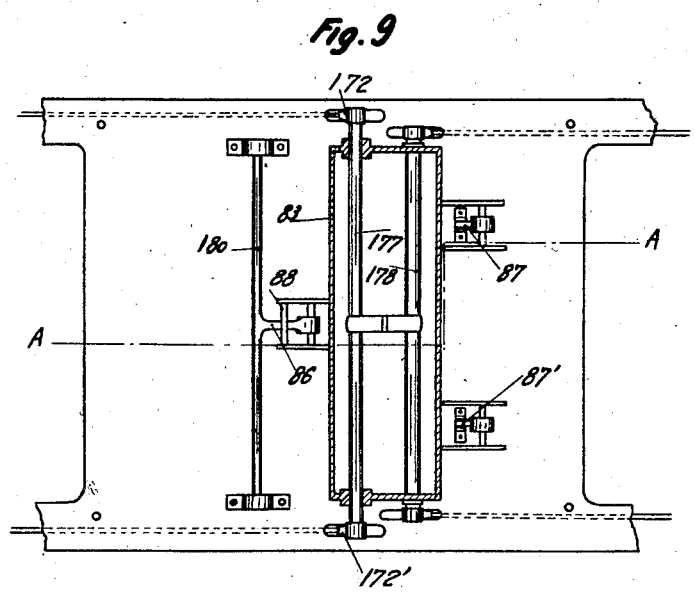

Patented Nov. 23, 1937

2,099,819

UNITED STATES PATENT OFFICE 2,099,819

VEHICLE SUSPENSION

Pierre Ernest Mercier, Paris, France

Application March 9, 1935, Serial No. 10,268
In France March 10, 1934

11 Claims. (Cl. 280—104)

Vehicles are usually provided with assemblies of wheels which are coupled together in pairs by axles arranged transversely of the longitudinal axis of the vehicle and attached to the body to be suspended by springs. The coupling of the wheels in pairs by means of axles results in an interaction between the individual wheels of a pair whereby the suspension of the body is effected and when the pair of wheels are the guiding wheels of the vehicle these interactions cause reactions and oscillations in the steering as a result of gyroscopic effects.

It has been supposed that by mounting each wheel separately these disadvantageous interactions would be prevented; consequently constructions called "independent wheel systems" which eliminate the use of axles have been devised.

These constructions as now employed are a definite improvement over the old type of suspension, but it will be appreciated that whilst injurious interactions between the wheels of the same suspension may exist interactions which have a favourable effect on the suspension may also be brought into play. The object of the invention is to provide a wheel suspension for a vehicle, which is applicable both to the axle type of vehicle and to the type having independently suspended wheels, and which brings into play the advantageous interaction referred to.

The invention consists in making the forces transmitted by each wheel dependent upon the mass to be suspended, so that it is possible to bring into operation opposing forces reacting in the three possible movements of the suspended mass with respect to a horizontal plane through the wheels. The three possible movements of the suspended mass are as follows:

(a) a movement of rotation of the suspended mass about an axis parallel to the horizontal longitudinal axis of the chassis (rolling).

(b) a movement of rotation of the suspended mass about a transverse axis of the chassis (hunting or pitching).

(c) a vertical displacement of the suspended mass. According to the invention the point of contact with the ground of each wheel of a vehicle may thus be caused in a different plane, by exerting torsional forces on the chassis connected to the mass to be suspended which are as small as desired.

The invention is applicable to any kind of four-wheel rail or road vehicle and may also be applied to vehicles having more than four wheels.

The invention is preferably carried into effect by a purely mechanical construction.

It is in fact very important to realize the independence of the laws of reaction in connection with the three movements which occur. For example when effecting a turning movement the suspension should react very strongly to the rolling movement whilst it is immaterial if the suspension is given a maximum resilience in respect of the vertical displacements of the suspended mass. These two conditions are, in suspensions of known type, contradictory, and cannot be simultaneously satisfied.

In the construction according to the present invention the pairs of wheels located on the same side of the vertical longitudinal symmetrical plane are connected with each other, this connection being effected in such a manner that when one of the wheels dips more than the others it effects the reverse movement of the wheel which is interconnected therewith. In the absence of any important variation of load on the yielding structure of the suspension the ratio between the dipping of one of the wheels and the lifting of the other wheel is determined beforehand in order to regulate the couple which opposes the hunting or pitching.

Furthermore, the resilient means, acting on the pairs of wheels located on each side of the longitudinal symmetrical plane are interconnected. This has the effect of modifying this elastic reaction according as to whether the vehicle tends to dip or to rise symmetrically with respect to the mean plane through the points of contact of the wheels or whether on the other hand it tends to sway about its longitudinal axis of oscillation.

A partial solution of the problem which may be sufficient in certain cases, for example the suspension of slow vehicles, and those vehicles having numerous wheels and moving on very uneven ground, this solution consisting in employing only the particular arrangement set out above which compensates for the hunting or pitching movement.

The invention will be hereinafter more particularly described with reference to the accompanying drawings which illustrate by way of example different methods of carrying the invention into effect, these methods using a mechanical means of transmission.

Referring to the drawings:

Fig. 1 is a perspective view of the chassis frame of a vehicle made according to the invention and embodying the same in a practical and operative form, and disclosing elastic connecting means interposed between the pairs of wheels involved and simultaneously the use of gearing to interconnect the connecting means of two distinct pairs of wheels.

Fig. 2 is a rear view of the same with parts in section to further reveal the structure.

Fig. 3 illustrates a modification wherein torsion bars are used to provide resilience required in the operation according to the principles of the invention.

Figs. 4, 5 and 6 are fragmentary details of the structure of Fig. 3 in enlarged form.

Fig. 6a is a fragmentary view of a modification of the same.

Fig. 7 is an enlarged fragmentary view of the major rear portion of Fig. 3, with a portion of a cover torn away to disclose the construction and operative relations of the parts.

Fig. 8 is a cross-section taken on line A—A in Fig. 9 of a further modification of the form of the invention shown in Figs. 3 to 6.

Finally, Fig. 9 is a plan view of the same modification in partial section with a cover and shock absorber removed in order to better disclose certain details.

Throughout the views, the same reference numerals indicate the same or corresponding parts.

A preferred embodiment of the invention comprises an entirely mechanical construction of connections which transmit the movements of the wheels.

Referring to Figure 1 the interconnection of the movements of the wheels is effected by means of two torsion bars 49 and 49' associated with two wheels A and B located on the same side of the vehicle which latter is diagrammatically represented by the rectangle 50, the said torsion bars being provided at their free ends with a device connected to the wheel-carrying arm to which the bar is not directly connected, the said device fulfilling the condition that the raising of one wheel effects the lowering of the other in the absence of variation of load, and thus of torsional couple. There is consequently obtained the result required, namely, the free warping for the wheels of the side under consideration, the corresponding or symmetrical wheels are interconnected by means of a mechanical system illustrated in detail in Fig. 2. There is illustrated in Figure 1, by way of example, a set of straight gears 51 for effecting the reversal of the rotations of the extremity of the torsion bars. Combinations of levers might also be employed or any equivalent device. The wheels on the other side of the vehicle are of course equipped in the same manner.

As compared with the advantages which they may present, it is necessary generally with the various mechanical constructions of the interconnection of the wheels to effect the damping on each wheel separately; furthermore, the mechanical constructions are hardly favorable to the freedom of warping of the polygon of the points of contact.

Nevertheless, a further modification for carrying out the mechanical interconnection of the four wheels of a vehicle may be designed which permits of obtaining resistance to pitching, and rolling as well as the required flexibility in vertical movement and the condition of free warping of the points of contact, these results being obtained independently of one another by means of only three torsion bars and three dampers arranged transversely to the chassis.

Figure 3 illustrates diagrammatically a similar mechanical interconnection in the case where the wheels are supported by four arms or parallelograms, parallel to the longitudinal axis of the vehicle chassis 63. The same construction is obviously applicable in the case where two or four wheel-carrying arms are disposed perpendicular to the longitudinal axis of the vehicle, it being merely necessary to use angle reversing devices or bell crank levers or any other equivalent devices. The four levers such as 68 and 69 and 68', 69' the angular displacements of which correspond to the displacements of the wheels, are connected by rods 70, 71 and 70', 71' respectively which extend preferably under the floor of the vehicle to levers such as 72, 73, and 72', 73' respectively, integral, as will be described later, with a rocking bar 74 movable about a vertical axis Z'Z. The bar 74 through the intermediary of a member 75, is also movable about a horizontal axis Y'Y perpendicular to the longitudinal and vertical symmetrical plane of the vehicle. Figure 4 illustrates diagrammatically and on a larger scale, the member 75 to which the rocking bar 74 is pivotally secured about the vertical axis Z'Z.

The bar 74 may be formed of a tube reinforced by a metal plate with flanged edges 76 or device having a conveniently large inertia. The levers 73 are integral with the extremities of the rocking bar and can only be displaced as a unit with the said rocking bar. On the other hand, the levers 72 are integral with the extremities of a torsion rod 77 located in the interior of a torsion tube 78 (Figure 5). These two members 77 and 78 are united together at their centres by means of a rivet 79 or by any other convenient means. The whole of the assembly formed by the torsion rod 77 and the tube 78 is fitted inside the body of the rocking bar 74, the extremities of the tube 78 being integral with this body. In Figure 6 is illustrated a projection on a longitudinal symmetrical plane, of a practical form of the rocking bar and its support. The shaft Y'Y of Figure 4 in Figure 6 indicated at 80 comprises a torsion rod, the extremities of which are connected to the chassis, the centre of this rod being rigidly secured to the member 75. The torsional movements of the shaft Y'Y are controlled by means of a shock absorber 81 one of the extremities of which is integral with the member 75 whilst the other extremity is fixed to the chassis by a swivel joint, axle or equivalent arrangement. The damping of the relative movements of the levers 72 and 73 caused by the torsion of the rods and tubes 77 and 78 is effected in a similar manner by means of shock absorbers 83 and a symmetrically analogous shock absorber on the other side of the underframe which are connected to the ends of the levers 72 and 73.

The free warping is possible due to the fact that the rocking bar 74 is displaceable about the vertical axis Z'Z. The pitching movement is caused by the rotation of the rocking bar about the axis Y'Y. The pitching restoration moment is caused by the flexibility of the torsion bar 80 and is controlled by the shock absorber 81.

The rolling movement is obtained by a reverse movement of the levers 72 and 73 and those symmetrical with respect thereto and by the movement of the rocking bar about the axis Z'Z. This movement introduces the resistance of the flexibility of the rod 77 alone and may be controlled by the shock absorbers associated with the levers 72 and 73 and those symmetrical with respect thereto. The vertical movement corresponds to a symmetrical movement of the levers 72 and 73 accompanied by a rotation of the rocking bar about the axis Y'Y. The flexibility comprises the sum of the torsion flexibilities of the rod 77 and of the tube 78 combined with that of the rod 80. It is therefore possible to satisfy any conditions required for the suspension, all the interactions being obtained by a suitable choice of the levers 68, 69, 72, 73, and of the rods 77, 80 and of the tube 78.

The unit formed by the mechanism of the rocking bar and its support is preferably fitted in the interior of a hollow cross girder 82 serving as a base for seats, as illustrated in Figure 6 by the reference 82. It is evident that the torsion tube 78 can be replaced by a second torsion rod disposed at the side of the rod 77 and parallel thereto, in such a manner that these two rods are connected at their centres by levers and small connecting rods or by suitable gearing. Furthermore, if the levers 68 and 69 are not of the same length it is not necessary that the levers 72 and 72' be at the same distance from each other as the levers 73 and 73'. By suitably choosing these dimensions other conditions will be satisfied, such as the inclination of the axis of the vehicle with respect to the plane of the wheels in accordance with the load, and the displacement of the centre of gravity which may result therefrom. This is only one of the advantages of this embodiment of the invention as the said embodiment can be readily adapted to suit various additional conditions.

It will be readily understood that it is possible to provide by suitable connections, such as shackles or the like, a movement of translation of the axis ZZ' equivalent to the component normal to this axis of the angular displacement about the axis YY'.

Such an arrangement is illustrated in Figures 7, 8 and 9, where the rocking bar 183 is in the form of a box in which are mounted torsion rods 177 and 178 which are linked together by toothed sectors 84 and 85. The rods 178 is rigidly connected to the box which transmits its movements by means of the levers 172 and 173 to the corresponding link rods; the rod 177 on the other hand is rotatable in the box and its rotary movement is transmitted to the link rods through the levers 172, 172'. The rocking bar 183 is suspended on three shackles 86, 87 and 87', which may be hinged thereto by means of yielding sockets to permit any required movement thereof. The shackle 86 is fixed at one end to the torsion rod 180, the extremities of which are integral with the chassis. The lower extremities of the shackles 87 and 87' are fixed to the chassis in such a manner that the three shackles remain parallel upon symmetrical displacements of the rocking bar. The rocking bar is connected to the chassis by means of a shock absorber 181 as shown in Figure 6.

It is well understood that the constructional details are capable of being modified without departing from the spirit and scope of the invention. For example, equivalent mechanical elements may be substituted for the various connecting members hereinbefore described. Furthermore the various modifications of the invention described in connection with a chassis having independent wheels, are equally applicable to vehicles having undivided axles connecting the wheels in pairs.

What I claim and desire to secure by Letters Patent of the United States is:—

1. A vehicle comprising a chassis, wheels located on each longitudinal side of the chassis, means for suspending the chassis on the wheels, resilient reaction means capable of resilient reactions connected to said suspension means, and means comprising mechanical transmissions for interconnecting the resilient reaction means of a plurality of wheels located on the same side of the chassis, these mechanical transmissions comprising torsion rods coupled by gearing in order to interconnect the resilient reactions occurring on each side of said chassis.

2. A vehicle comprising a chassis, wheels located on each longitudinal side of the chassis, means for suspending the chassis on the wheels, resilient reaction means capable of resilient reactions connected to said suspension means, and means comprising mechanical transmissions for interconnecting the resilient reaction means of a plurality of wheels located on the same side of the chassis, these mechanical transmissions comprising three torsion rods and three shock absorbers arranged transversely of the chassis in order to interconnect the resilient reactions occurring on each side of said chassis.

3. A vehicle comprising a chassis, wheels located on each longitudinal side of the chassis, means for suspending the chassis on the wheels comprising wheel-carrying arms, resilient reaction means capable of resilient reactions connected to said arms, means for interconnecting the resilient reaction means of a plurality of wheels located on the same side of the chassis, the latter means comprising a transverse rocking arm suspended so as to rock about an axis perpendicular thereto, means for causing the said axis to be movable in the longitudinal symmetrical plane of the chassis and levers integral with the rocking lever and interconnected with the wheel-carrying arms.

4. A vehicle as claimed in claim 3, wherein the rocking arm comprises a member integral with two torsion bars connected together at their centres, distinct levers being attached to the said member and others to one of the said torsion bars.

5. A vehicle as claimed in claim 3, wherein the rocking arm comprises a member integral with two torsion bars connected together at their centres, one of these bars comprising a tube in the interior of which is arranged the other bar, while distinct levers are attached to the said member and other levers are attached to one of the said torsion bars.

6. A vehicle comprising a chassis, wheels located on each longitudinal side of the chassis, means comprising wheel-carrying arms for suspending the chassis on the wheels, resilient reaction means capable of resilient reactions connected to said arms, means for interconnecting the resilient reaction means of a plurality of wheels located on the same side of the chassis, the latter means comprising a transverse rocking arm suspended so as to rock about an axis perpendicular thereto, means for causing the said axis to be movable in the longitudinal symmetrical plane of the chassis about a horizontal axis constituted by a torsion bar the extremities of which are connected to the chassis and the centre of which supports the main portion of the rocking arm, and levers integral with the rocking arm and interconnected with the wheel-carrying arms.

7. A vehicle comprising a chassis, wheels located on each longitudinal side of the chassis, means comprising wheel-carrying arms for suspending the chassis on the wheels, resilient reaction means capable of resilient reactions connected to said arms, means for interconnecting the resilient reaction means of a plurality of wheels located on the same side of the chassis, the latter means comprising a transverse rocking arm suspended so as to rock about an axis perpendicular thereto, means for causing the said axis to be movable in the longitudinal symmetrical plane of the chassis about a horizontal axis constituted by a torsion bar the extremities of which are connected to the chassis and the centre of which supports the said rocking arm, a shock absorber supported on the chassis and controlling the movements of the horizontal torsion bar, and levers integral with the rocking lever and interconnected with the wheel-carrying arms.

8. A vehicle comprising a chassis, wheels located on each longitudinal side of the chassis, means for suspending the chassis on the wheels, comprising wheel-carrying arms, resilient reaction means capable of resilient reactions connected to said arms, means for interconnecting the resilient reaction means of a plurality of wheels located on the same side of the chassis, the latter means comprising a transverse rocking arm suspended so as to rock about an axis perpendicular thereto, means for causing the said axis to be movable in the longitudinal symmetrical plane of the chassis about a horizontal axis constituted by a torsion bar the extremities of which are connected to the chassis and the centre of which supports the said rocking arm, a shock absorber supported on the chassis and controlling the movements of the horizontal torsion bar and levers integral with the rocking lever and interconnected with the wheel-carrying arms through shock absorbers.

9. A vehicle comprising a chassis, wheels located on each longitudinal side of the chassis, means for suspending the chassis on the wheels, comprising wheel-carrying arms, resilient reaction means capable of resilient reactions connected to said arms, and means for interconnecting the resilient reaction means of a plurality of wheels located on the same side of the chassis, the latter means comprising a transverse rocking arm suspended so as to rock about an axis perpendicular thereto, means for causing the said axis to be movable transversely parallel to the longitudinal symmetrical plane of the chassis, comprising connections by means of shackles and levers integral with the rocking arm and interconnected with the wheel-carrying arms.

10. A vehicle according to claim 1, in combination with means for interconnecting the yielding reactions of the pairs of wheels located one on each side of the chassis and means comprising a yielding connecting rod of variable length, the movable elements of which are attached to the levers of the wheel-carrying arms.

11. A vehicle according to claim 1, in combination with means for interconnecting the resilient reactions of the pairs of wheels located one on each side of the chassis, these means comprising a yielding connecting rod of variable length, the movable elements of which are attached to the levers of the wheel-carrying arms, and a shock absorber connected to this connecting rod.

PIERRE ERNEST MERCIER.